United States Patent
Venkatesan et al.

(10) Patent No.: US 10,254,838 B2
(45) Date of Patent: Apr. 9, 2019

(54) ARCHITECTURE AND COMMUNICATION PROTOCOL FOR HAPTIC OUTPUT DEVICES

(71) Applicant: Immersion Corporation, San Jose, CA (US)

(72) Inventors: Srivatsav Venkatesan, Sunnyvale, CA (US); Kaniyalal Shah, Fremont, CA (US); Andrew C. Prock, San Mateo, CA (US); Henry Da Costa, Montreal (CA)

(73) Assignee: IMMERSION CORPORATION, San Jose, CA (US)

(*) Notice: Subject to any disclaimer, the term of this patent is extended or adjusted under 35 U.S.C. 154(b) by 407 days.

(21) Appl. No.: 14/979,283

(22) Filed: Dec. 22, 2015

(65) Prior Publication Data

US 2016/0175703 A1 Jun. 23, 2016

Related U.S. Application Data

(60) Provisional application No. 62/096,251, filed on Dec. 23, 2014.

(51) Int. Cl.
*A63F 13/00* (2014.01)
*G06F 3/01* (2006.01)
(Continued)

(52) U.S. Cl.
CPC ............ *G06F 3/016* (2013.01); *A63F 13/218* (2014.09); *A63F 13/23* (2014.09); *A63F 13/285* (2014.09); *A63F 13/42* (2014.09)

(58) Field of Classification Search
None
See application file for complete search history.

(56) References Cited

U.S. PATENT DOCUMENTS 6,020,876 A * 2/2000 Rosenberg ............ G06F 3/011
  345/157
6,184,868 B1 * 2/2001 Shahoian ............... A63F 13/06
  345/156

(Continued)

FOREIGN PATENT DOCUMENTS

KR    20120021540 A    3/2012
WO       0068916 A1   11/2000

OTHER PUBLICATIONS

Anonymous: "USB in a NutShell—Chapter 3—USB Protocols", Sep. 28, 2010 (Sep. 28, 2010), XP055092166, Retrieved from the Internet: URL:http://web.archive.org/web/20100928184346/http://www.beyondlogic.org/usbnutshell/usb3.shtml [ retrieved on Dec. 9, 2013].

*Primary Examiner* — Paul A D'Agostino
(74) *Attorney, Agent, or Firm* — Miles & Stockbridge P.C.

(57) ABSTRACT

The embodiments are directed toward an architecture and communication protocol for controlling haptic output devices. According to the embodiments, a composite drive signal is generated that includes a first drive signal to be rendered by a first haptic output device, a second drive signal to be rendered by a second haptic output device, and a packet identifier. A controller includes the first haptic output device that is associated with a first user input element and the second haptic output device associated with a second user input element. The composite drive signal is transmitted to controller, and the execution order of the first and second drive signals is determined based on the packet identifier.

19 Claims, 14 Drawing Sheets

(51) Int. Cl.
*A63F 13/285* (2014.01)
*A63F 13/23* (2014.01)
*A63F 13/42* (2014.01)
*A63F 13/218* (2014.01)

(56) References Cited

U.S. PATENT DOCUMENTS

| | | |
|---|---|---|
| 6,661,403 B1* | 12/2003 | Rosenberg .............. A63F 13/06 345/156 |
| 9,367,136 B2 | 6/2016 | Latta et al. |
| 9,370,459 B2 | 6/2016 | Mahoney |
| 9,370,704 B2 | 6/2016 | Marty |
| 9,392,094 B2 | 7/2016 | Hunt et al. |
| 9,462,262 B1 | 10/2016 | Worley, III et al. |
| 9,626,805 B2 | 4/2017 | Lampotang et al. |
| 9,645,646 B2 | 5/2017 | Cowley et al. |
| 9,652,037 B2 | 5/2017 | Rubin et al. |
| 9,760,166 B2 | 9/2017 | Ammi et al. |
| 9,811,854 B2 | 11/2017 | Lucido |
| 9,851,799 B2 | 12/2017 | Keller et al. |
| 9,933,851 B2 | 4/2018 | Goslin et al. |
| 9,948,885 B2 | 4/2018 | Kurzweil |
| 2004/0249484 A1 | 12/2004 | Paillard |
| 2005/0052415 A1 | 3/2005 | Braun et al. |
| 2006/0220788 A1 | 10/2006 | Dietz et al. |
| 2006/0290662 A1* | 12/2006 | Houston ................ A63F 13/06 345/156 |
| 2007/0149285 A1 | 6/2007 | Osnato et al. |
| 2007/0279392 A1* | 12/2007 | Rosenberg ............. A63F 13/10 345/173 |
| 2008/0231594 A1* | 9/2008 | Hardwick .............. A63F 13/12 345/156 |
| 2009/0122006 A1* | 5/2009 | Nielsen ................. A63F 13/10 345/156 |
| 2010/0073304 A1* | 3/2010 | Grant .................... G06F 3/016 345/173 |
| 2010/0231508 A1* | 9/2010 | Cruz-Hernandez ..... G06F 3/016 345/156 |
| 2011/0121953 A1* | 5/2011 | Grant .................... A63F 13/245 340/407.1 |
| 2011/0260990 A1* | 10/2011 | Ali ....................... G06F 3/016 345/173 |
| 2012/0232780 A1* | 9/2012 | Delson .................. A63F 13/06 701/400 |
| 2014/0315642 A1 | 10/2014 | Grant et al. |
| 2016/0070348 A1 | 3/2016 | Cowley et al. |
| 2016/0084605 A1 | 3/2016 | Monti |
| 2016/0086457 A1 | 3/2016 | Baron et al. |
| 2016/0163227 A1 | 6/2016 | Penake et al. |
| 2016/0166930 A1 | 6/2016 | Brav et al. |
| 2016/0169635 A1 | 6/2016 | Hannigan et al. |
| 2016/0170508 A1 | 6/2016 | Moore et al. |
| 2016/0171860 A1 | 6/2016 | Hannigan et al. |
| 2016/0171908 A1 | 6/2016 | Moore et al. |
| 2016/0187969 A1 | 6/2016 | Larsen et al. |
| 2016/0187974 A1 | 6/2016 | Mallinson |
| 2016/0201888 A1 | 7/2016 | Ackley et al. |
| 2016/0209658 A1 | 7/2016 | Zalewski |
| 2016/0214015 A1 | 7/2016 | Osman et al. |
| 2016/0214016 A1 | 7/2016 | Stafford |
| 2016/0375170 A1 | 12/2016 | Kursula et al. |
| 2017/0102771 A1 | 4/2017 | Lei |
| 2017/0103574 A1 | 4/2017 | Faaborg et al. |
| 2017/0131775 A1 | 5/2017 | Clements |
| 2017/0148281 A1 | 5/2017 | Do et al. |
| 2017/0154505 A1 | 6/2017 | Kim |
| 2017/0168576 A1 | 6/2017 | Keller et al. |
| 2017/0168773 A1 | 6/2017 | Keller et al. |
| 2017/0178407 A1 | 6/2017 | Gaidar et al. |
| 2017/0203221 A1 | 7/2017 | Goslin et al. |
| 2017/0203225 A1 | 7/2017 | Goslin |
| 2017/0206709 A1 | 7/2017 | Goslin et al. |
| 2017/0214782 A1 | 7/2017 | Brinda |
| 2017/0257270 A1 | 9/2017 | Goslin et al. |
| 2017/0352185 A1 | 12/2017 | Bonilla Acevedo et al. |
| 2018/0050267 A1 | 2/2018 | Jones |
| 2018/0053351 A1 | 2/2018 | Anderson |
| 2018/0077976 A1 | 3/2018 | Keller et al. |
| 2018/0081436 A1 | 3/2018 | Keller et al. |
| 2018/0093181 A1 | 4/2018 | Goslin et al. |
| 2018/0107277 A1 | 4/2018 | Keller et al. |
| 2018/0120936 A1 | 5/2018 | Keller et al. |

* cited by examiner

| Byte Offset | Purpose | Semantics |
|---|---|---|
| 0 | Report ID<br>710 | Unique report identifier for this report<br><br>Value: 0x21 |
| 1 | Num_bytes<br>740 | Number of bytes in the entire report |
| 2 | Start tick<br>720 | Essentially a write pointer modifier for the driver buffer, tells the firmware where to put the incoming data |
| 3 | AMP_EN/Hold bits<br>730 | Split into two 4 bit sections,<br><br>BIT 0: Hold Bit for actuator0<br>BIT 1: Hold Bit for actuator1<br>BIT 2: Hold Bit for actuator2<br>BIT 3: Hold Bit for actuator3<br><br>Value 1: Continue to hold<br>Value 0: Disable AMP after playing this report<br><br>Bits 4 thru 7 signifies the what actuators should be enabled<br><br>BIT 4: Enable Actuator0<br>BIT 5: Enable Actuator1<br>BIT 6: Enable Actuator2<br>BIT 7: Enable Actuator3<br><br>Value 0: Do not enable |

Fig. 8
800

| Byte Offset | Purpose | Semantics |
|---|---|---|
| 0 | Report ID | Unique identifier for this report Value : 0x1E |
| 1 | LX | X position for left joystick |
| 2 | LY | Y position for left joystick |
| 3 | RX | X position for right joystick |
| 4 | RY | Y position for right joystick |
| 5 | LT | Left Trigger position Max value is reported when there is no interaction Min value reported when triggers are fully pulled in |
| 6 | RT | Right Trigger position Max value is reported when there is no interaction Min value reported when triggers are fully pulled in |
| 7 and 8 | Button Information returned in Little Endian format | Gamepad returns a 16 bit value and populates upto 16 buttons. If some of the buttons are not supported by the gamepad, the gamepad still packages 16 bits. The host should ignore the bits irrelevant to the gamepad. Bit values: 0 : Button not pressed 1 : Button pressed Refer to the table below for bit offset and button information location |

Fig. 9
900

| Byte Offset | Purpose | Semantics |
|---|---|---|
| 0 | Report ID | Unique Identifier for this report value: 0x10 |
| 1 | Total number of bytes in this report | |
| 2 | Num Actuators | Num Actuators in the system |
| 3 | Actuator update rate | The update rate of haptics on the actuator. This is the same value for all actuators |
| 4 | Buffer allocated for each actuator | Firmware buffer allocation for each actuator. This is used for calculating the start tick index while sending the haptic report |
| 5 | Communication Protocol Version Lo | LSB of communication protocol version number followed by the device |
| 6 | Communication Protocol Version Hi | MSB of communication protocol version number followed by the device |
| 7 | Firmware Version Lo | Firmware version LSB |
| 8 | Firmware Version Hi | Firmware Version MSB |
| 9-32 | Firmware version commit ID | Git commit id of the firmware source code used for build with attribute. Attribute value may be "dirty" if built from developer machine |
| 33-63 | Reserved | Reserved for future use |

Fig. 10
1000

| Byte Offset | Purpose | Semantics |
|---|---|---|
| 0 | Report ID | Unique identifier of this report. Value : 0x11 |
| 1 | Command_ID | Command ID of the most recent command received by the device. This value is equal to the report ID of the report sent most recently to the device. |
| 2 | Status | The status of the report. This contains information if there were any errors encountered while parsing the reports. Please refer the table below for return values and interpretations. |
| 3-7 | Reserved | Reserved for future use |

| Return values for status byte | Semantics | Comments |
|---|---|---|
| 0 | Packet_OK | Packet was parsed successfully without errors |
| 1 | Packet_Invalid | Packet had fields with invalid values |
| 2 | Packet_Unsupported | The requested functionality is unsupported by the device |
| 3 | Packet_Error_Unknown | Unknown error |

Fig. 11
1100

| Byte Offset | Purpose | Semantics |
|---|---|---|
| 0 | Report ID | Unique identifier for this report. Value: 0x12 |
| 1 | Module ID | ID of the firmware module whose configuration needs to be changed |
| 2 | Module Feature ID | ID of the required feature in the selected module |
| 3 | Parameter | The value associated with the configuration change. The semantics of the parameter is dependent on the selected module and the selected feature |
| 4-7 | Reserved | Reserved for future use |

| Module | Module ID | Feature | Feature ID | Parameter |
|---|---|---|---|---|
| Haptic Drive Handler | 0x01 | Actuator Update Rate | 0x01 | Parameter value should be desired update rate of actuators in milliseconds. This will affect the update rate of all actuators. The supported values are 1 and 5 |
| Special Modes Handler | 0x02 | Debug Mode | 0x01 | 1: The controller will be put in debug mode<br><br>0: Exit Debug Mode |
| | | DFU Mode | 0x02 | 1: Enter DFU mode |

ARCHITECTURE AND COMMUNICATION PROTOCOL FOR HAPTIC OUTPUT DEVICES

PRIORITY APPLICATION

This application claims the benefits of U.S. Provisional Patent Application No. 62/096,251, filed on Dec. 23, 2014, which is incorporated herein by reference in its entirety.

FIELD OF INVENTION

The embodiments are generally directed to electronic devices, and more particularly, to electronic devices that produce haptic effects.

BACKGROUND

Video games and video game systems have become extremely popular. Video game devices or controllers typically use visual and auditory cues to provide feedback to a user. In some interface devices, kinesthetic feedback (e.g., active and resistive force feedback) and/or tactile feedback (e.g., vibration, texture, temperature variation, and the like) may be provided to the user. In general, such feedback is collectively known as "haptic feedback" or "haptic effects." Haptic feedback provides cues that enhance and simplify a user's interaction with a video game controller, or other electronic device. For example, haptic effects may provide cues to users of video game controllers or other electronic devices to alert the user to specific events, or provide realistic feedback to create greater sensory immersion within a simulated or virtual environment.

Other devices in which a user interacts with a user input element to cause an action also may benefit from haptic feedback or haptic effects. For example, such devices may include medical devices, automotive controls, remote controls, and other similar devices.

SUMMARY OF THE INVENTION

Embodiments of the present invention are directed toward electronic devices configured to produce haptic effects that substantially improve upon the related art.

Features and advantages of the embodiments are set forth in the description which follows, or will be apparent from the description, or may be learned by practice of the invention.

In one example embodiment, functionality for controlling haptic output devices according to an architecture and communication protocol is provided. A composite drive signal is generated that includes a first drive signal to be rendered by a first haptic output device, a second drive signal to be rendered by a second haptic output device, and a packet identifier. A controller includes the first haptic output device that is associated with a first user input element and the second haptic output device associated with a second user input element. The composite drive signal is transmitted to the controller, and the execution order of the first and second drive signals is determined based on the packet identifier.

It is to be understood that both the foregoing general description and the following detailed description are exemplary and explanatory and are not intended to limit the invention to the described examples.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 7 illustrates an example haptic stream report sent from a host device to a controller according to an example embodiment to the present invention.

FIG. 8 illustrates an example haptic stream report sent from a controller to a host device according to an example embodiment to the present invention.

FIG. 9 illustrates an example capability report sent from a controller to a host device according to an example embodiment to the present invention.

FIG. 10 illustrates an example status request report sent from a host device to a controller according to an example embodiment to the present invention.

FIG. 11 illustrates an example configuration change report sent from a host device to a controller according to an example embodiment to the present invention.

DETAILED DESCRIPTION:

Example embodiments are directed toward functionality for controlling haptic output devices according to an architecture and communication protocol. A composite drive signal is generated that includes a first drive signal to be rendered by a first haptic output device, a second drive signal to be rendered by a second haptic output device, and a packet identifier. A controller includes the first haptic output device that is associated with a first user input element and the second haptic output device associated with a second user input element. The composite drive signal is transmitted to the controller, and the execution order of the first and second drive signals is determined based on the packet identifier.

In the various embodiments, a variety of user interfaces and methods for using a device are described. In some embodiments, the device is a portable electronic device (e.g., a game controller, console, mobile phone, smartphone, tablet, etc.). It should be understood, however, that the user interfaces and associated methods may be applied to numerous other devices, such as personal computers, medical devices, laptops, and the like that may include one or more other physical user-interface devices, such as a keyboard, mouse, trackball and the like.

Figure 1:
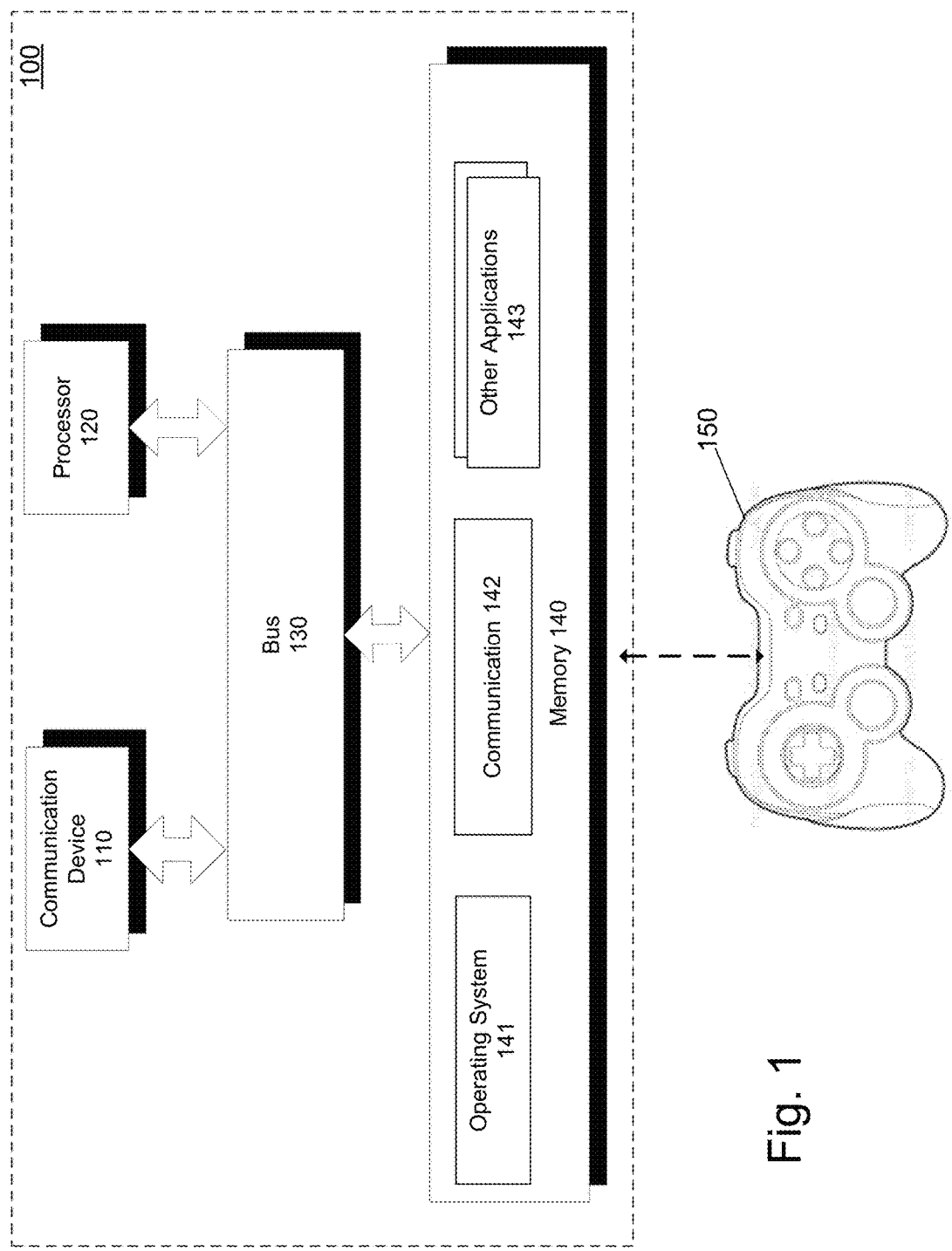
FIG. 1 illustrates a block diagram of a system according to an example embodiment of the present invention.

FIG. 1 illustrates a block diagram of a system 100 according to an example embodiment of the present invention.

System 100 may include a communication device 110 configured to transmit and/or receive data from remote sources. Communication device 110 may enable connectivity between a processor 120 and other devices by encoding data to be sent from processor 120 to another device over a network (not shown) and decoding data received from another system over the network for processor 120.

For example, communication device 110 may include a network interface card that is configured to provide wireless network communications. A variety of wireless communication techniques may be used including infrared, radio, Bluetooth, Wi-Fi, and/or cellular communications. Alternatively, communication device 110 may be configured to provide wired network connection(s), such as an Ethernet connection.

Processor 120 may comprise one or more general or specific purpose processors to perform computation and control functions of system 100. Processor 120 may include a single integrated circuit, such as a micro-processing device, or may include multiple integrated circuit devices and/or circuit boards working in cooperation to accomplish the functions of processor 120. In addition, processor 120 may execute computer programs, such as an operating system 141, a communication module 142, and other applications 143, stored within memory 140.

System 100 may include memory 140 for storing information and instructions for execution by processor 120. Memory 140 may contain various components for retrieving, presenting, modifying, and storing data. For example, memory 140 may store software modules that provide functionality when executed by processor 120. The modules may include operating system 141 that provides operating system functionality for system 100. The modules may further include communication module 142 that is configured to control packet based communications between system 100 and controller 150. In some instances, the packet based communications are relayed between system 100 and controller 150 over one or more USB ("Universal Serial Bus") channels. Communication module 142 also interfaces with a variety of other applications 143, and relays the haptic instructions originating from other applications 143 using one or more standard and/or proprietary communication protocols. Although USB channels are described herein as an example, the embodiments of the invention may be readily applied to other communication protocols, such as Bluetooth. Other applications 143 within system 100 may include additional functionality, such as peripheral firmware configured to provide control functionality for a peripheral device, such as controller 150 (e.g., a gamepad, wearable device, etc.).

Non-transitory memory 140 may include a variety of computer-readable media that may be accessed by processor 120. In the various embodiments, memory 140 may include volatile and nonvolatile media, removable and non-removable media. For example, memory 140 may include any combination of random access memory ("RAM"), dynamic RAM ("DRAM"), static RAM ("SRAM"), read only memory ("ROM"), flash memory, cache memory, and/or any other type of non-transitory computer-readable media. Alternatively, or additionally, memory 140 may include one or more network or cloud accessible storage media.

Although shown as a single system, the functionality of system 100 may be implemented as a distributed system. For example, memory 140 and processor 120 may be distributed across multiple different computers that collectively comprise system 100. In one embodiment, system 100 may be part of a device (e.g., personal computer, console, video game console, etc.), and system 100 provides haptic effect functionality for the device. In another embodiment, system 100 may be separate from the device, and may remotely provide the aforementioned functionality for the device.

System 100 may be operably connected to controller 150. Controller 150 may be a peripheral device configured to provide input to the system 100. Controller 150 may be operably connected to system 100 using either a wireless connection or a wired connection. Controller 150 also may include a local processor configured to communicate with system 100 using either a wireless connection or a wired connection. Alternatively, controller 150 may be configured to not include a local processor, and all input signals and/or output signals associated with controller 150 may be processed by the components of system 100. In embodiments in which controller 150 has a local processor, additional functionality, such as communication modules and peripheral firmware configured to provide control functionality may reside within controller 150. Here, the clock of the host device and the clock of the peripheral device may be synchronized.

Controller 150 may further include one or more digital buttons, one or more analog buttons, one or more bumpers, one or more directional pads, one or more analog or digital sticks, one or more driving wheels, and/or one or more user input elements that can be interacted with by a user, and that can provide input to system 100. Controller 150 may also include one or more analog or digital trigger buttons (or "triggers") that can further be interacted with by the user, and that can further provide input to system 100. As is described below in greater detail, controller 150 can further include a motor, or another type of actuator or haptic output device, configured to exert a bi-directional push/pull force on at least one trigger of controller 150.

Controller 150 can also include one or more actuators, or other types of haptic output devices. The local processor of controller 150, or processor 120 in embodiments where controller 150 does not include a local processor, may transmit a haptic signal associated with a haptic effect to at least one actuator of controller 150. The actuator, in turn, outputs haptic effects such as vibrotactile haptic effects, kinesthetic haptic effects, or deformation haptic effects, in response to the haptic signal. The haptic effects can be experienced at a user input element (e.g., a digital button, analog button, bumper, directional pad, analog or digital stick, driving wheel, or trigger) of controller 150. Alternatively, the haptic effects can be experienced at an outer surface of controller 150.

An actuator is an example of a haptic output device, where a haptic output device is a device configured to output haptic effects, such as vibrotactile haptic effects, electrostatic friction haptic effects, temperature variation, and/or deformation haptic effects, in response to a drive signal. In alternate embodiments, the one or more actuators within controller 150 can be replaced by some other type of haptic output device. The haptic output device may be, for example, an electric motor, an electro-magnetic actuator, a voice coil, a shape memory alloy, an electro-active polymer, a solenoid, an eccentric rotating mass motor ("ERM"), a harmonic ERM motor ("HERM"), a linear resonant actuator ("LRA"), a piezoelectric actuator, a high bandwidth actuator, an electroactive polymer ("EAP") actuator, an electrostatic friction display, or an ultrasonic vibration generator. In some instances, the haptic output device may include haptic output drive circuit. In some embodiments, the haptic output device may be unidirectional or bidirectional.

Controller 150 may further include one or more speakers. The local processor of controller 150, or processor 120 in embodiments where controller 150 does not include a local processor, may transmit an audio signal to at least one speaker of controller 150, which in turn outputs audio effects. The speaker may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, and a digital loudspeaker.

Controller 150 can further include one or more sensors. A sensor may be configured to detect a form of energy, or other physical property, such as, but not limited to, sound, movement, acceleration, bio signals, distance, flow, force/pressure/strain/bend, humidity, linear position, orientation/inclination, radio frequency, rotary position, rotary velocity, manipulation of a switch, temperature, vibration, or visible light intensity. The sensor may further be configured to convert the detected energy, or other physical property, into an electrical signal, or any signal that represents virtual sensor information, and controller 150 can send the converted signal to the local processor of controller 150, or processor 120 in embodiments where controller 150 does not include a local processor.

Figure 2:
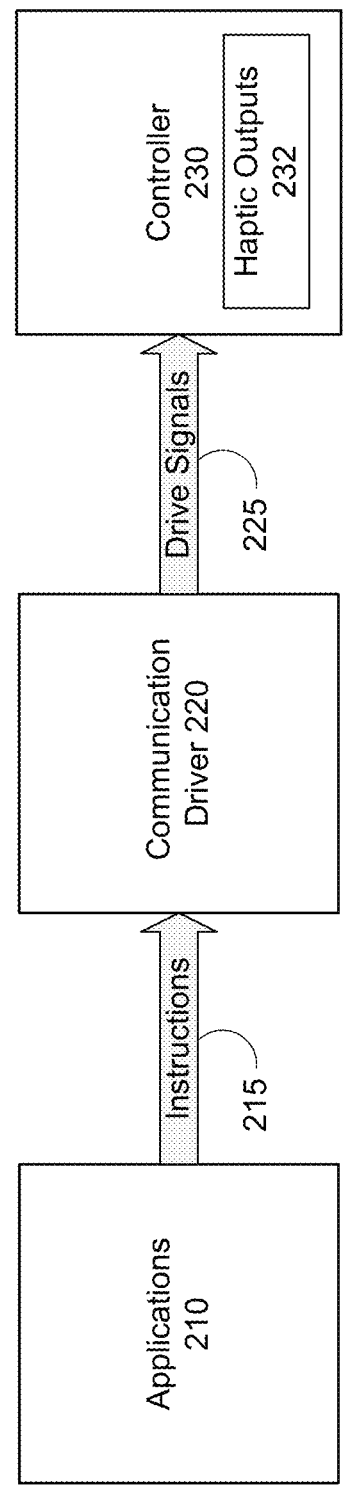
FIG. 2 is a simplified block diagram illustrating a system for providing a haptic effect according to an example embodiment of the present invention.

FIG. 2 is a simplified block diagram illustrating a system 200 for providing a haptic effect according to an example embodiment of the present invention.

As shown in FIG. 2, system 200 includes one or more applications 210. Each of applications 210 may generate a variety of instructions 215. Instructions 215 are supplied to a communication driver 220. Upon receiving instructions 215, communication driver 220 may generate one or more haptic drive signals 225 based on instructions 215. In some configurations, haptic drive signals 225 may be configured according to one or more report formats. Haptic drive signals 225 are then transmitted to a controller 230.

At controller 230, haptic drive signals 225 may be executed by one or more haptic output devices 232. By executing haptic drive signals 225, haptic output devices 232 render the haptic effects to an end user.

Figure 3:
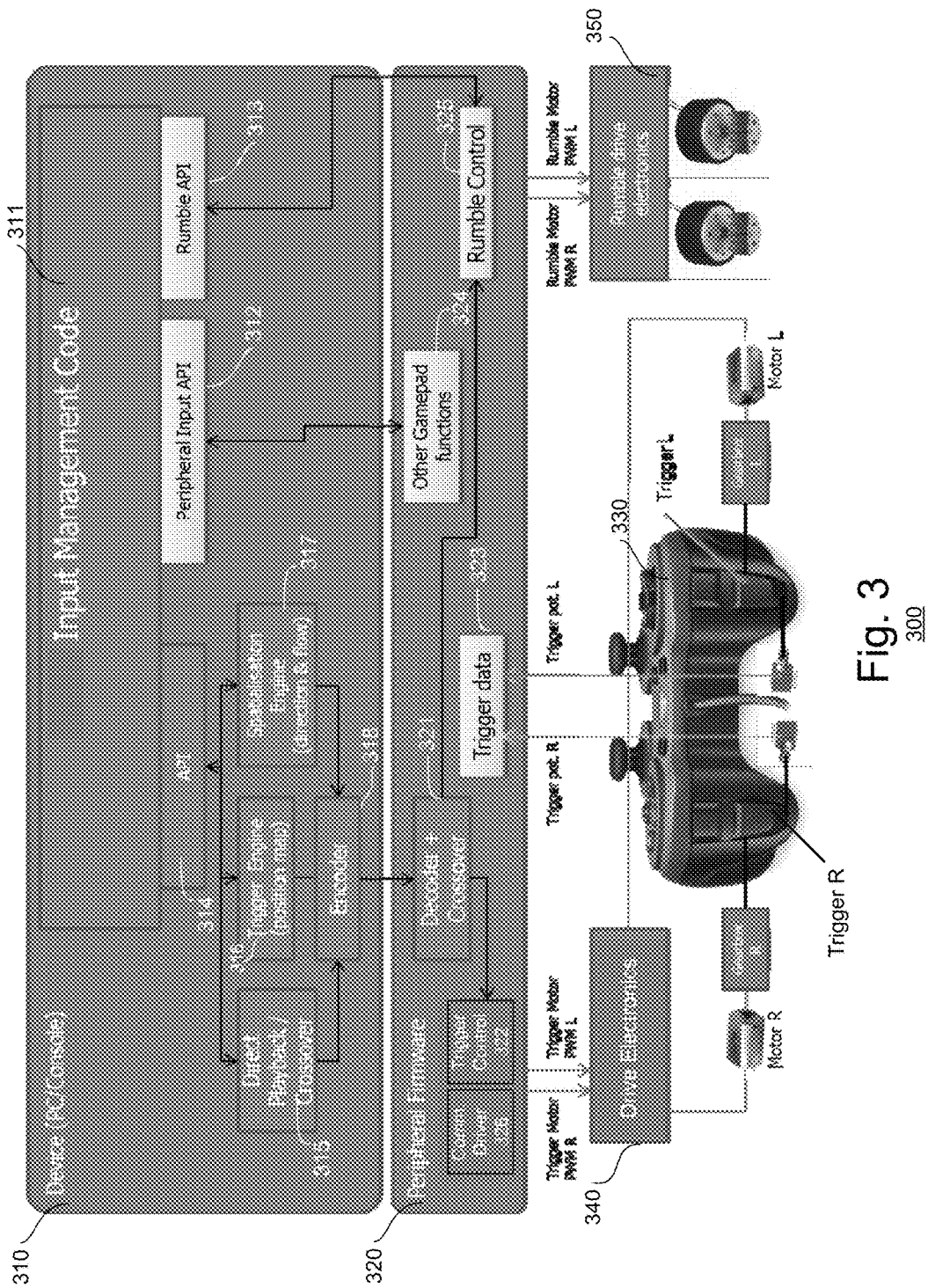
FIG. 3 illustrates a block diagram of a haptic effect software stack according to an example embodiment of the present invention.

FIG. 3 illustrates a block diagram of a haptic effect software stack 300 according to an example embodiment of the present invention. As shown in FIG. 3, software stack 300 includes device modules 310, peripheral firmware modules 320, controller modules 330, drive modules 340, and rumble drive modules 350. Haptic effect software stack 300 is implemented on a system, such as system 100 of FIG. 1.

Device modules 310 may include a variety of modules such as input management code 311, peripheral input application programming interface ("API") 312, rumble API 313, haptic effect API 314, direct playback/crossover 315, trigger engine 316, spatialization engine 317, and encoder 318.

Input management code 311 may include a set of computer-readable instructions that manage input provided by controller 330 in the context of a game application, or other type of application, executed within a device.

Peripheral input API 312 may include a set of computer-readable functions or routines that enable game input management code 311 to interact with peripheral firmware 320 in order to receive and manage input provided by controller 330.

Rumble API 313 may include a set of computer-readable functions or routines that enable input management code 311 to interact with peripheral firmware 320 in order to transmit rumble instructions to one or more rumble motors or rumble actuators of controller 330 (e.g., rumble motors L and R of FIG. 3). In addition, a rumble instruction may cause a rumble motor or rumble actuator of controller 330 to produce a general or rumble haptic effect.

Haptic effect API 314 (identified in FIG. 3 as "API") may include a set of computer-readable functions or routines that are accessible to input management code 311, and that enable input management code 311 to interact with peripheral firmware 320 in order to transmit haptic instructions to controller 330. In addition, a haptic instruction may cause one or more targeted motors or targeted actuators of controller 330 to produce a haptic effect at one or more user input elements of controller 330.

Haptic effect API 314 also may store one or more haptic effect definitions. A haptic effect definition is a data structure that includes haptic data, such as a haptic signal, that is pre-defined and that can be stored within a storage, such as a haptic file or haptic stream, and that can be sent to one or more rumble motors, rumble actuators, targeted motors, or targeted actuators, to produce a haptic effect at a component, or user input element, of controller 330. The haptic data can include one or more attributes of the corresponding haptic effect, where the attributes can be stored as parameters. Example parameters of a haptic effect definition may include an amplitude parameter, a frequency parameter, a waveform parameter, an envelope parameter, a magnitude (or strength) parameter, and a duration parameter.

Haptic effect API 314 may enable game input management code 311 to interact with direct playback/crossover 315, trigger engine 316, and spatialization engine 317, and may further manage direct playback/crossover 315, trigger engine 316, and spatialization engine 317 according to requests invoked by game input management code 311. Further, haptic effect API 314 may store data used for communication with peripheral firmware 320, and used for generation of one or more haptic effects.

Direct playback/crossover 315 may receive haptic data as input, produce haptic data as output, and transmit haptic data to one or more targeted motors, or targeted actuators, of controller 330 (e.g., motors L and R of FIG. 3). In some embodiments, direct playback/crossover 315 may output the input haptic data directly, without modifying a format of the input haptic data. This results in an "as-is" playback of the input haptic data. In other embodiments, direct playback/crossover 315 may convert the haptic data that is input from a first format to a second format, and can further output the converted haptic data. Depending on the type of playback, direct playback/crossover 315 may optionally use a programmable crossover to convert the haptic data. By converting the haptic data, device modules may deconstruct the haptic effect and playback the haptic effect at multiple actuators.

The format of the haptic data may be a haptic elementary stream ("HES") format. A HES format is a file or data format for representing haptic data that may be streamed to a device. The haptic data can be represented in a manner that is identical or similar to how uncompressed sound is represented, although the haptic data can be encrypted within the HES format.

Trigger engine 316 may receive haptic data, such as a haptic effect definition, and may modify the haptic data based on user input data, such as trigger data 323. Trigger data is data that includes one or more parameters that indicate a position and/or range of one or more triggers of controller 330 (e.g., triggers L and R of FIG. 3). Trigger engine 316 may further transmit haptic instructions to controller 330. For example, trigger engine 316 may transmit haptic instructions to a variety of user-input elements of controller 330. As previously described, a haptic instruction may cause one or more targeted motors or targeted actuators of controller 330 to produce a haptic effect at one or more user-input elements of controller 330.

Spatialization engine 317 may receive haptic data and may modify the haptic data based on spatialization data. Spatialization data may include data that indicates a desired direction and/or flow of a haptic effect, such as an ordering of haptic effects on respective user input elements. In certain embodiments, spatialization engine 317 may receive spatialization data that includes a direction and/or flow from input management code 311.

Spatialization engine 317 may modify the haptic data so that a haptic effect, such as a trigger haptic effect, is scaled for one or more rumble motors, or rumble actuators, of controller 330 (e.g., rumble motors L and R of FIG. 3), and that the haptic effect is also scaled for one or more targeted motors, or targeted actuators, of controller 330 (e.g., motors L and R, as illustrated in FIG. 3). In other words, spatialization engine 317 may modify the haptic data that is sent to each motor or actuator, and thus, modify the haptic effect that is experienced at each motor or actuator, in order to convey a sense of direction and flow of an overall haptic effect. For example, in order to emphasize a haptic effect experienced at a motor or actuator, spatialization engine 317 may scale one or more portions of the haptic effect. For example, spatialization engine 317 may scale haptic data that is sent to the motor or actuator that causes the haptic effect to be experienced, causing the haptic effect to be more pronounced (e.g., increased magnitude, duration, etc.). Additionally, spatialization engine 317 may scale haptic data that is sent to other motors or actuators, causing other haptic effects that are experienced at those motors or actuators to be less pronounced (e.g., decreased magnitude, duration, etc.). In some embodiments, spatialization engine 317 may modify the haptic data in real-time or substantially in real time. Further, in some embodiments, spatialization engine 317 may have non-linear relationships between inputs and motor, or actuator, outputs in order to exaggerate an overall haptic effect.

Encoder 318 encodes haptic data received from direct playback/crossover 315, trigger engine 316, and/or spatialization engine 317 into a format. In one embodiment, the format may be an HES format. Encoder 318 may transmit the encoded haptic data to peripheral firmware 320.

Peripheral firmware 320 is firmware for one or more peripheral devices (e.g., controllers). Peripheral firmware 320 may include a variety of modules such as decoder and crossover 321, trigger control 322, trigger data 323, other functions 324, and rumble control 325.

Decoder and crossover 321 may receive the encoded haptic data from encoder 318 and decodes the encoded haptic data. In some embodiments, decoder and crossover 321 computes a programmable crossover in order to decode the encoded haptic data. Decoder and crossover 321 may compute the programmable crossover in real-time.

Trigger control 322 is a low-level control API for one or more targeted motors or targeted actuators of controller 330 (e.g., motors L and R of FIG. 3). Trigger control 322 may receive a trigger instruction and may convert the trigger instruction into a low-level trigger instruction for a specified targeted motor or targeted actuator of controller 330, and may transmit the low-level trigger instruction to the specified targeted motor or targeted actuator of controller 330. The low-level trigger instruction may cause the specified targeted motor or targeted actuator to produce a trigger haptic effect at a specified trigger of controller 330.

Trigger data 323, as previously described, is data that includes one or more parameters that indicate a position and/or range of one or more triggers of controller 330 (e.g., triggers L and R of FIG. 3). Trigger data 323 may be received from controller 330 by peripheral firmware 320. Peripheral firmware 320 may further store trigger data 323, and may further transmit trigger data 323 to device modules 310.

Other gamepad functions 324 may be functions of controller 330 managed by peripheral firmware 320. Such functions may include such functions as wired/wireless communications, input reporting, protocol implementation, power management, etc.

Rumble control 325 is a low-level control API for one or more rumble motors or rumble actuators of controller 330 (e.g., rumble motors L and R of FIG. 3). Rumble control 325 may receive a rumble instruction, may convert the rumble instruction into a low-level rumble instruction for a specified rumble motor or rumble actuator of controller 330, and may transmit the low-level trigger instruction to the specified rumble motor or rumble actuator of controller 330.

Communication driver module 326 is a firmware module that is configured to control packet based communications between device modules 310 and controller 330. For example, the packet based communications may be relayed between device modules 310 and controller 330 over one or more USB channels. Upon receiving instructions from device modules 310, communication driver module 326 may generate one or more haptic drive signals. In some configurations, the haptic drive signals are generated according to one or more report formats.

Communication driver module 326 may include multiple sections of firmware that may be hardware dependent or independent. In some instances, sections of firmware that are hardware independent may be separated from the sections that are hardware dependent. Here, hardware independent firmware may interact with the hardware dependent firmware by using functional pointers.

Controller 330 may include triggers L and R. Controller 330 may further include gear boxes L and R and motors L and R. Motor L and gearbox L are operably coupled to trigger L within controller 330. Likewise, motor R and gearbox R are operably coupled to trigger R within controller 330. When motor L receives a trigger instruction, motor L and gearbox L may collectively cause a trigger haptic effect to be experienced at trigger L. Likewise, when motor R receives a trigger instruction, motor R and gearbox R may collectively cause a trigger haptic effect to be experienced at trigger R. Peripheral firmware 320 may send trigger instructions to motors L and R of controller 330 using drive electronics 340.

Controller 330 may further include potentiometers L and R. Potentiometer L may detect a position and/or range of trigger L, and may further send the detected position and/or range of trigger L to peripheral firmware 320 as trigger data. Likewise, potentiometer R may detect a position and/or range of trigger R, and may further send the detected position and/or range of trigger R to peripheral firmware 320 as trigger data.

Controller 330 may further include rumble motors L and R. When rumble motor L receives a rumble instruction, rumble motor L causes a haptic effect to be experienced along a left component of controller 330. Likewise, when rumble motor R receives a rumble instruction, rumble motor R causes a haptic effect to be experienced along a right component of controller 330. Peripheral firmware 320 may send rumble instructions to rumble motors L and R using rumble drive electronics 350.

Figure 4:
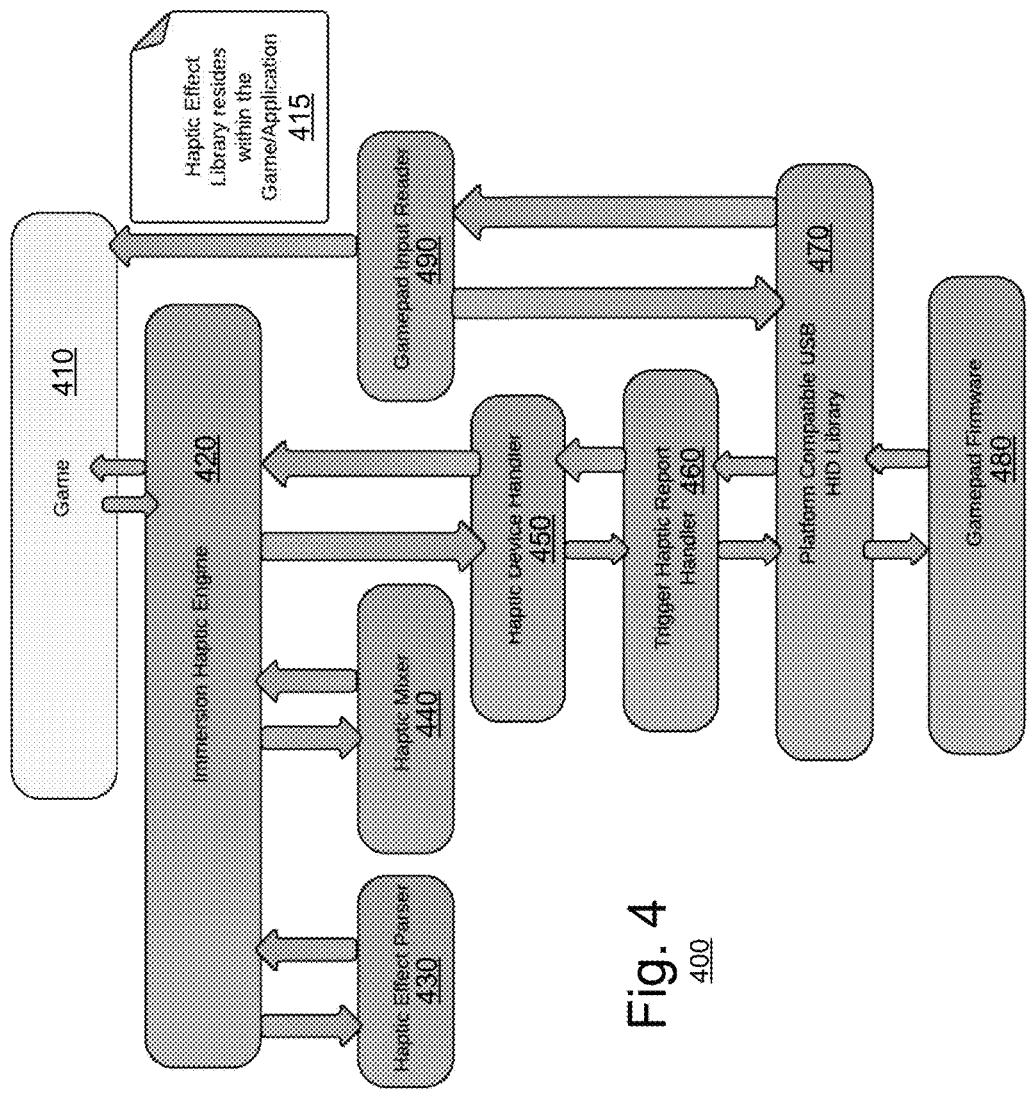
FIG. 4 is a simplified block diagram illustrating a system for controlling haptic communications according to an example embodiment of the present invention.

FIG. 4 is a simplified block diagram illustrating a system 400 for controlling haptic communications according to an example embodiment of the present invention.

As an input to system 400, one or more applications 410 may generate a variety of haptic instructions. In some instances, the haptic instructions may be retrieved from a haptic effect library 415. The haptic instructions may be parsed, mixed, and converted to packetized haptic drive signals suitable for transmission on a USB compliant channel by the various components of system 400.

A haptic engine 420 is a higher level API ("Application Programming Interface") that uses lower level API functions to manage the haptic effect instructions originating from applications 410. For example, haptic engine 420 may be configured to load, start, stop, modify, and/or render the playback of the haptic effects.

Haptic engine 420 interfaces with haptic effect parser 430. As its name implies, haptic effect parser 430 is configured to parse haptic effect instructions into segments defining their operational characteristics. In some instances, haptic effect parser 430 also may retrieve additional operational characteristics from memory (e.g., haptic effect library 415). Alternatively, or additionally, haptic effect parser 430 includes an API to load the haptic effects in memory, verify haptic effect formats, and retrieve a variety of information relating to the haptic effects, such as packet size, effect duration, and other haptic effect data.

Haptic engine 420 also interfaces with a haptic mixer 440. At haptic mixer 440, haptic instructions intended for different haptic output devices may be combined into a single haptic instruction set. By implementing haptic mixer 440, system 400 may simultaneously playback multiple haptic effects at different haptic output devices. Here, start and/or stop times for the various haptic effects may be adjusted and/or determined. In addition, haptic mixer 440 may manage the contents of a mixer buffer (not shown).

Haptic engine 420 further interfaces with a haptic device handler 450. Haptic device handler 450 initiates and manages communication with the haptic output devices. For example, haptic device handler 450 is configured to retrieve individual haptic output device handlers (e.g., identifiers). Accordingly, haptic device handler 450 may render haptic effects at the various haptic output devices of system 400. In some instances, haptic device handler 450 also initializes several state machine structures utilized to render the haptic effects.

Further, haptic device handler 450 interfaces with the USB communication layers, including haptic report handler 460 and USB HID ("Human Interface Device") library 470. Haptic report handler 460 packages the haptic instructions originating from applications 410 into packetized data suitable for transmission on a USB channel. And, USB HID library 470 stores a variety of functions used to facilitate USB communications. For example, USB HID library 470 stores functions to encode and decode the haptic instructions. In another example, USB HID library 470 stores USB descriptors and functions to handle the USB communication.

By utilizing the various components of system 400, including components 420-470, USB compliant communications between the controller (such as controller 230 of FIG. 2) and application 410 may be achieved. Between the controller and application 410, additional layers such as gamepad firmware 480 and controller input reader 490 may be used. For example, controller input reader 490 reports the state of the user input elements of the controller to applications 410.

Figure 5:
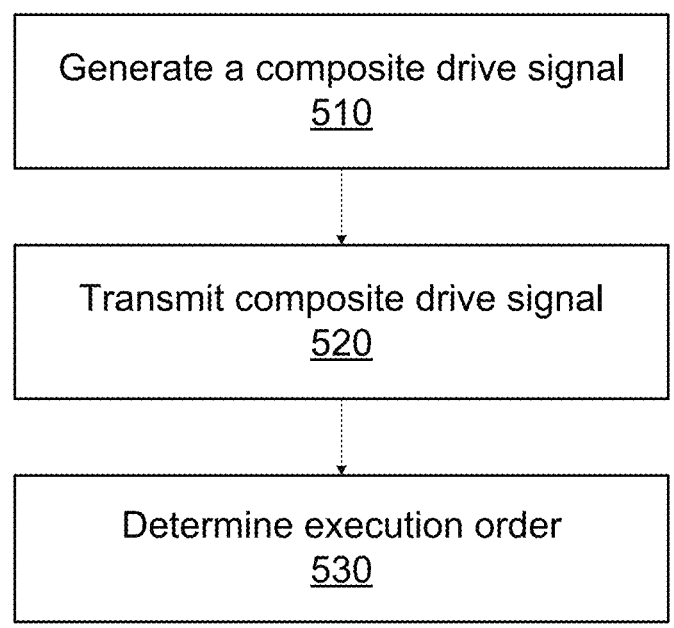
FIG. 5 illustrates a flow diagram of functionality for driving a plurality of haptic output devices according to an example embodiment of the present invention.

FIG. 5 illustrates a flow diagram of functionality for driving a plurality of haptic output devices according to an example embodiment of the present invention. In some configurations, the functionality of the flow diagram of FIG. 5 (and FIG. 6 below) may be implemented by software stored in memory or other computer readable or tangible media, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At the outset, functionality 500 generates a composite drive signal that includes a first drive signal to be rendered by a first haptic output device, a second drive signal to be rendered by a second haptic output device, and a packet identifier, at 510. Here, the first haptic output device may be associated with a first user input element and the second haptic output device may be associated with a second user input element. Next, at 520, the composite drive signal is transmitted to a controller having the first and second haptic output devices. Lastly, the execution order of the first and second drive signals is determined based on the packet identifier, 530.

Figure 6:
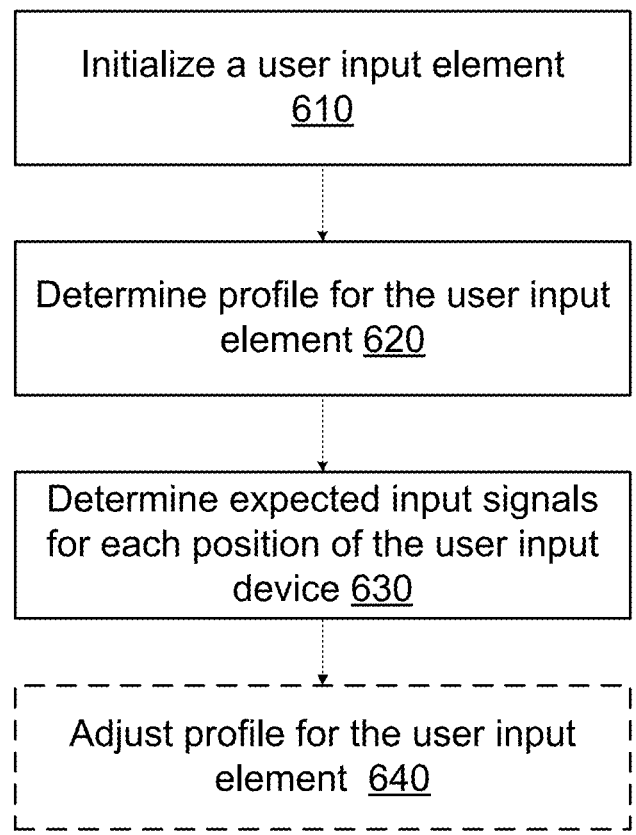
FIG. 6 illustrates a flow diagram of functionality for mapping positions of a user input element with expected input signals according to an example embodiment of the present invention.

FIG. 6 illustrates a flow diagram of functionality 600 for mapping positions of a user input element with expected input signals according to an example embodiment of the present invention.

At the outset, the user input elements of the controller may be initialized, at 610. Here, functionality 600 may initially set position and range information for the user input elements. In some instances, these values may be calculated based on the movement of the user input device from the maximum out position to the grounding position.

Next, functionality 600 determines and stores profiles for the user input elements, at 620. The determined profiles may map each position of the user input device to an analog to digital conversion ("ADC") value. For example, the determined profiles of 620 may map each position of the user input device to an ADC value between 0 and 255.

The determined profiles may utilize either an increasing or a decreasing profile. For example, an increasing profile will produce a value [0,255] when the position of the user input value is read from an 8 bit ADC data. Similarly, a decreasing profile will produce a value [255,0] when read from the 8 bit ADC data.

Subsequently, at 630, functionality 600 determines and stores an expected input signal for each position of the user input device. In some instances, ranges of user input values may be associated with expected input signals.

In some instances, the resting position of the user input elements may vary at different times. For example, after use of the various user input devices, some of the user input devices may not return to the same resting position when the user interaction is removed. In such instances, functionality 600 may adjust the determined profile and expected user input values for such user input elements, at 640. Accordingly, the changed resting position(s) may be accounted for while monitoring the position of the user input elements.

FIG. 7 illustrates an example haptic stream report 700 sent from a host device to a controller according to an example embodiment to the present invention. Within haptic stream report 700, a report identifier 710 may be associated with a timer identifier 720, and haptic drive packets 730. Haptic drive packets may include a predetermined number of bytes (e.g., 25 bytes) allocated to each of the haptic output devices (e.g., left rumble, right rumble, left trigger, right trigger, etc.). The overall length of haptic stream report 700 may be indicated by number of bytes identifier 740.

Within haptic drive packets 730, a force value may be modified and/or applied to each haptic output device when the haptic stream report is updated (e.g., periodically every 5ms). For example, if the host device receives a request to play a new haptic effect, it may retrieve haptic effect data from memory, and populate haptic stream report 700 with force values to be applied on multiple haptic output devices for an upcoming 70ms (e.g., 14 force values per actuator yields 14*5ms). Here, timer identifier 720 such as start tick value, at byte offset 2, may be used to synchronize haptic instructions by ensuring their storage at the correct locations within the drive buffers of the haptic output devices.

In the various configurations, the semantics and the range of force values may depend on the haptic output device and its directionality. For example, two types of haptic output devices include trigger and rumble actuators. Trigger actuators are typically bidirectional and are configured to respond to push and pull motions. By contrast, rumble actuators may be bidirectional or unidirectional. The range of force values for both rumble and trigger actuators may be the same (e.g., 0x00 and 0xFF). However, the haptic output devices may utilize range of force values differently based on their respective characteristics.

For the trigger actuators example, the force values in the range [0,127] may move the trigger actuators in a pull direction. Here, the strength of the pull may decrease as the force value increases. The force value of 128 may not push or pull the trigger actuators. And, the force values in the range [129,255] may move the trigger actuators in a push direction. Here, the strength of the push increases as the force value increases.

In another example, for unidirectional rumble actuators, the force values in the range [0,127] may be ignored. The force value of 128 may not move the unidirectional rumble actuator, and the force value in the range [129,255] may move the unidirectional rumble actuator in the clockwise direction with speed increasing as the force value increases.

In yet another example, for bidirectional rumble actuators, the force values in the range [0,127] may move the actuators in the counter-clockwise direction. The force value of 128 may not move the actuator. The force values in the range [129,255] may move the actuators in the clockwise direction with speed increasing as the force value increases.

Thus, haptic stream report 700 provides an example composite drive signal. In this example configuration, drive signals for a plurality of haptic output devices may be simultaneously supplied to the controller within one reporting structure (e.g., 700). In turn, the controller may determine the execution (or execution order) for the plurality of haptic output devices based on the various fields within haptic stream report 700, such report identifier 710, timer identifier 720, and haptic drive packets 730.

FIG. 8 illustrates an example haptic stream report 800 sent from a controller to a host device according to an example embodiment to the present invention. Haptic stream report 800 may communicate information about the positions of the user input elements associated with the haptic output devices. For example, haptic stream report 800 may store data for six potentiometer values, of 1 byte each, to convey the trigger and joystick positions. Example haptic stream report 800 can store and report up to sixteen buttons allocating 1 bit for every button state.

FIG. 9 illustrates an example capability report 900 sent from a controller to a host device according to an example embodiment to the present invention. Capability report 900 may communicate controller capabilities, such as the number of haptic output devices, the haptic device update rates, and the buffer identifiers allocated to each haptic output device. In addition, capability report 900 may further identify communication protocols and/or firmware supported by the controller.

FIG. 10 illustrates an example status request report 1000 sent from a host device to a controller according to an example embodiment to the present invention. For example, the host device may check the status of the most recent USB packet or command. In response to status request report 1000, the controller may report that the command is valid, invalid, unsupported, and the like.

FIG. 11 illustrates an example configuration change report 1100 sent from a host device to a controller according to an example embodiment to the present invention. Using configuration change report, the controller may request changes to the firmware settings of the host device. For example, configuration change report 1100 may be used to change the haptic output device update rate.

Each of the reports 800-1100 of FIGS. 8-11 illustrates an additional example composite signal. In each of these examples, the positions, capabilities, status, and configuration of multiple user input elements and haptic output devices may be simultaneously communicated between the host device and the controller. In each of reports 800-1100, various identifiers, such as report, command, module, parameter, and other identifiers may be used.

Figure 12:
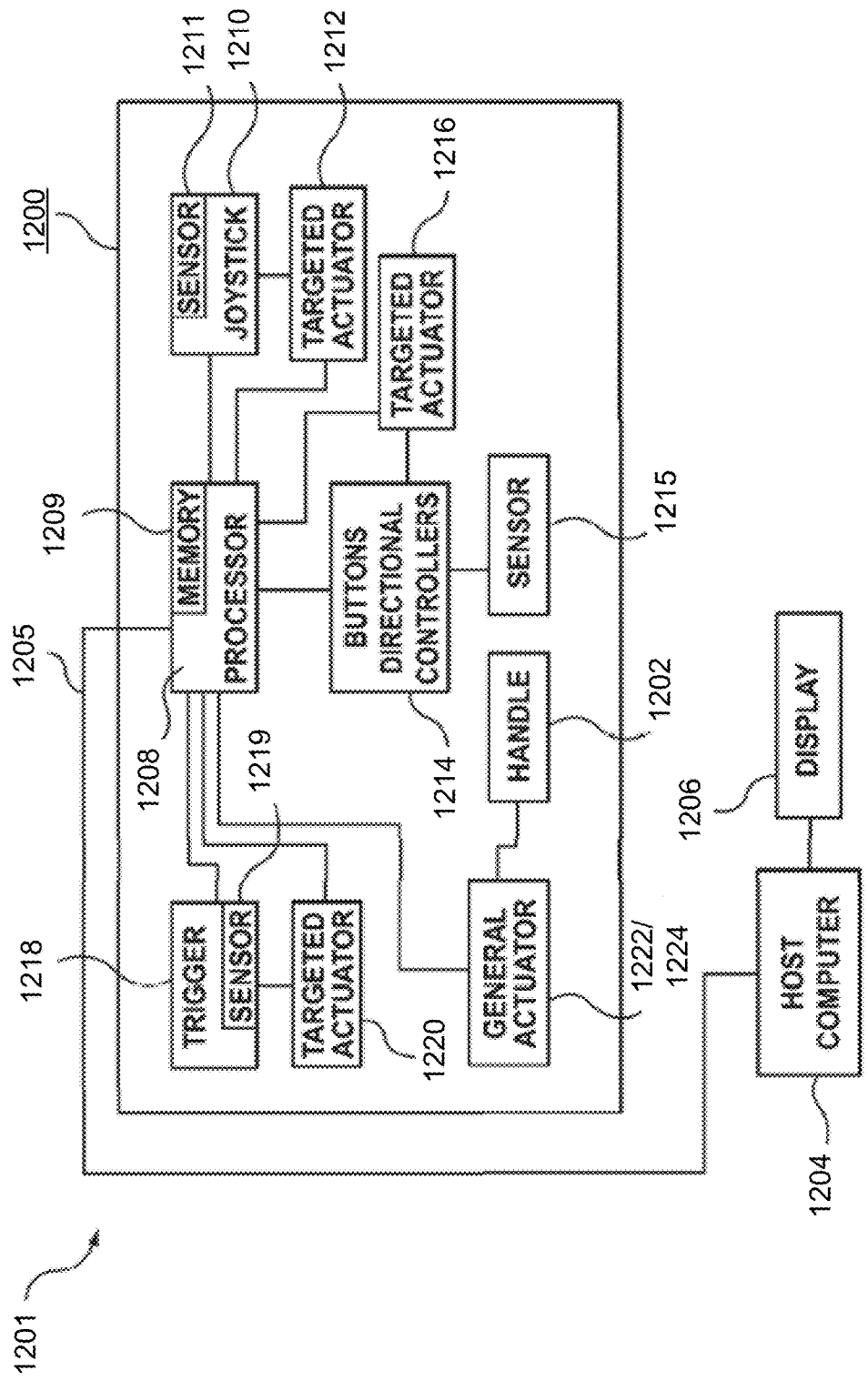
FIG. 12 illustrates a functional block diagram of a controller suitable for use with the embodiments of the present invention.

FIG. 12 illustrates a functional block diagram of a controller 1200 suitable for use with the embodiments of the present invention.

As illustrated in FIG. 12, controller 1200 may include one or more of a variety of user input elements. A user input element may refer to any interface device manipulated by the user to interact with host computer 1204. Example user input elements include analog or digital joy stick 1210, button 1214, trigger 1218, and the like. As understood by one of ordinary skill in the art, one or more of each user input element may be included on controller 1200. For example, the present description of trigger 1218 does not limit controller 1200 to a single trigger. Similarly, those skilled in the art understand that multiple analog or digital sticks, buttons, and other user input elements may be used.

Controller 1200 may include local processor 1208. Local processor 1208 may exchange commands and data with host computer 1204 via connection 1205. Connection 1205 may be a wired or wireless connection using one or more communication protocols known to those skilled in the art. In some instances, controller 1200 may be alternatively configured to not include local processor 1208. Here, input/output signals from controller 1200 may be handled and processed directly by host computer 1204. Host computer 1204 may be a gaming device console and display device 1206 may be screen which is operably coupled to the gaming device console. In some instances, host computer 1204 and display device 1206 may be combined into a single device.

Controller 1200 may include targeted actuators 1212, 1216, 1220 (e.g., motors) to directly drive each of the user input elements thereof as well as one or more general or rumble actuators 1222, 1224 operably coupled to housing 1202 in a location where a hand of the user is generally located. More particularly, analog or digital stick 1210 includes a targeted actuator or motor 1212 operably coupled thereto, button 1214 includes a targeted actuator or motor 1216 operably coupled thereto, and trigger 1218 includes a targeted actuator or motor 1220 operably coupled thereto. In addition to a plurality of targeted actuators, controller 1200 includes a position sensor operably coupled to each of the user input elements thereof. More particularly, analog or digital stick 1210 includes a position sensor 1211 operably coupled thereto, button 1214 includes a position sensor 1215 operably coupled thereto, and trigger 1218 includes a position sensor 1219 operably coupled thereto. Local processor 1208 is operably coupled to targeted actuators 1212, 1216, 1220 as well as position sensors 1211, 1215, 1219 of analog or digital stick 1210, button 1214, and trigger 1218, respectively. In response to signals received from position sensors 1211, 1215, 1219, local processor 1208 instructs targeted actuators 1212, 1216, 1220 to provide directed or targeted kinesthetic effects directly to analog or digital stick 1210, button 1214, and trigger 1218, respectively. Such targeted kinesthetic effects are discernible or distinguishable from general or rumble haptic effects produced by general actuators 1222, 1224 along the entire body of the controller. The collective haptic effects provide the user with a greater sense of immersion to the game as multiple modalities are being simultaneously engaged (e.g., video, audio, and haptics).

Figure 13A:
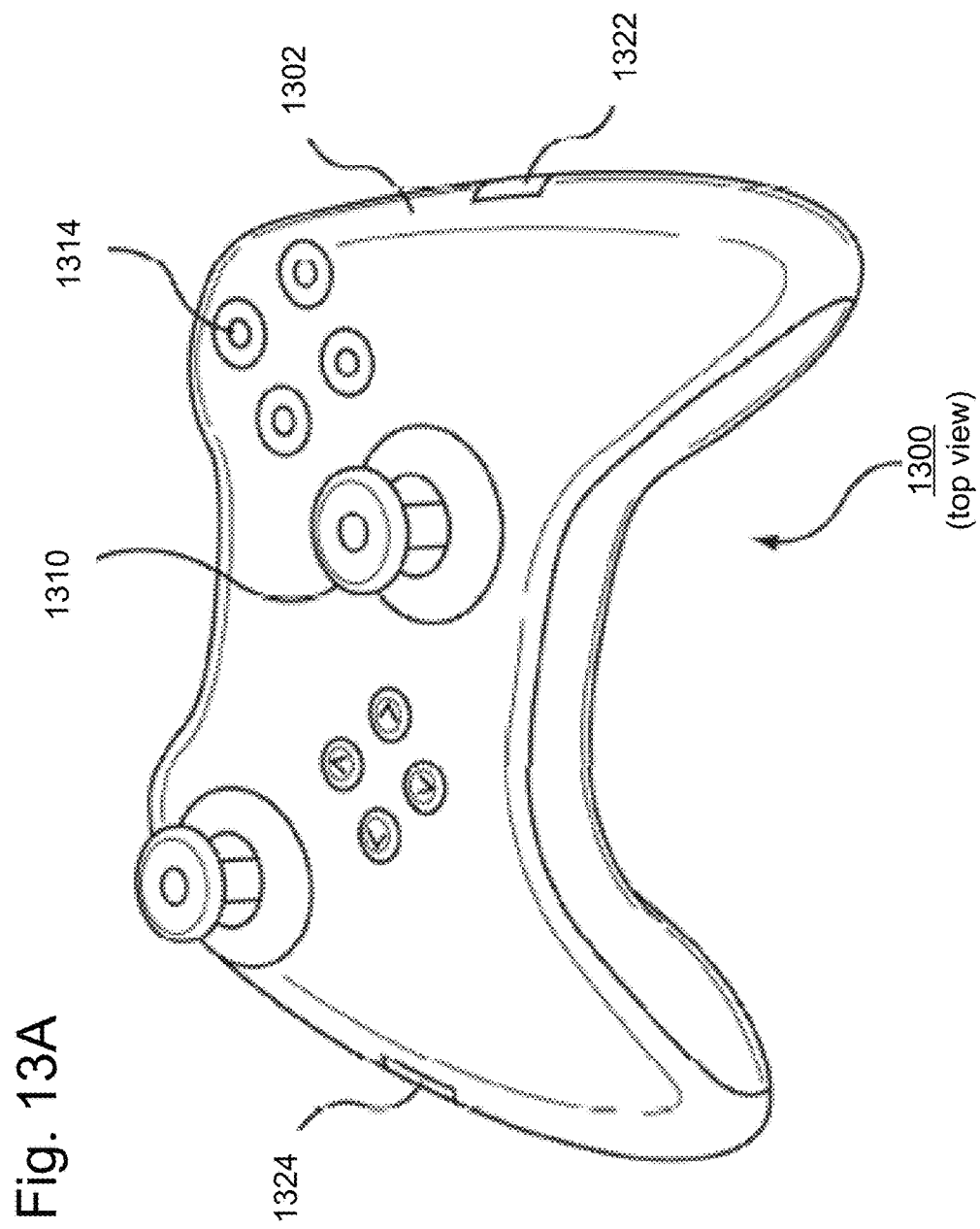
FIGS. 13A and 13B illustrate different views of a controller suitable for use with the embodiments of the present invention.
Figure 13B:
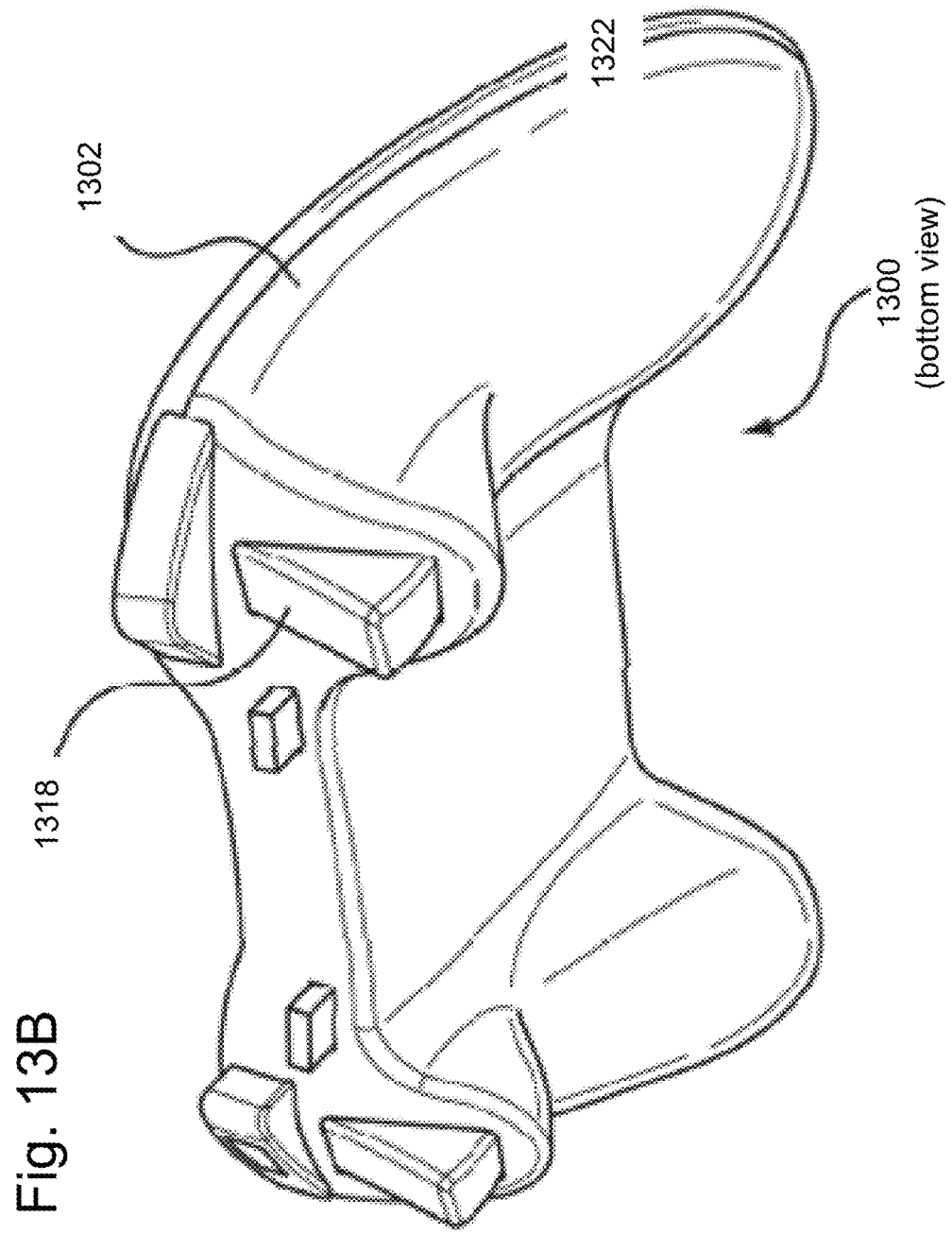

FIGS. 13A and 13B illustrate different views of a controller 1300 suitable for use with the embodiments of the present invention. As shown in FIGS. 13A and FIG. 13B, controller 1300 may include a variety of components such as housing 1302, analog or digital joy stick 1310, button(s) 1314, trigger 1318, and rumble actuators 1322 and 1324.

Housing 1302 is shaped to easily accommodate user gripping of controller 900. Controller 1300 is an example embodiment of a controller, and the embodiments of the invention may be readily applied to other controller shapes.

Accordingly, the embodiments of the present invention provide an improved architecture and communication protocol for the haptic output devices. By implementing the various embodiments, drive signals for multiple haptic output devices may be simultaneously communicated and executed.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method for driving a plurality of actuators, each actuator being associated with one of a plurality of user input elements, the method comprising:
    generating a composite drive signal packet data structure that includes a first drive signal to be rendered by a first haptic output device, a second drive signal to be rendered by a second haptic output device, and a packet identifier, the first haptic output device associated with a first user input element and the second haptic output device associated with a second user input element;
    transmitting, to a controller, the composite drive signal packet data structure; and
    determining an execution order of the first drive signal and the second drive signal at the controller according to the packet identifier,
    wherein one or more haptic effects are rendered to a user according to the first drive signal and the second drive signal.

2. The method according to claim 1, further comprising simultaneously transmitting the first and second drive signals.

3. The method according to claim 1, further comprising synchronizing a first clock and a second clock, the first clock being disposed at a host device, and the second clock being disposed at a peripheral device.

4. The method according to claim 1, wherein the composite drive signal packet data structure is received on a USB compliant channel.

5. The method according to claim 1, wherein the plurality of user input elements are disposed at a peripheral device comprising a controller or a gamepad.

6. The method according to claim 1, wherein the first or second user input element is a trigger element of a peripheral device.

7. A device comprising:
    a processor; and
    a memory storing a program for execution by the processor, the program including instructions for:
    generating a composite drive signal packet data structure that includes a first drive signal to be rendered by a first haptic output device, a second drive signal to be rendered by a second haptic output device, and a packet identifier, the first haptic output device associated with a first user input element and the second haptic output device associated with a second user input element;
    transmitting, to a controller, the composite drive signal packet data structure; and
    determining an execution order of the first drive signal and the second drive signal at the controller according to the packet identifier,
    wherein one or more haptic effects are rendered to a user according to the first drive signal and the second drive signal.

8. The device according to claim 7, further comprising instructions for simultaneously transmitting the first and second drive signals.

9. The device according to claim 7, further comprising instructions for synchronizing a first clock and a second clock, the first clock being disposed at a host device, and the second clock being disposed at a peripheral device.

10. The device according to claim 7, wherein the composite drive signal packet data structure is received on a USB compliant channel.

11. The device according to claim 7, wherein the first user input element and second user input element are disposed at a peripheral device comprising a controller or a gamepad.

12. The device according to claim 7, wherein the first or second user input element is a trigger element of a peripheral device.

13. A non-transitory computer readable storage medium storing a program configured to be executed by a processor, the program comprising instructions for:
    generating a composite drive signal packet data structure that includes a first drive signal to be rendered by a first haptic output device, a second drive signal to be rendered by a second haptic output device, and a packet identifier, the first haptic output device associated with a first user input element and the second haptic output device associated with a second user input element;

transmitting, to a controller, the composite drive signal packet data structure; and determining an execution order of the first drive signal and the second drive signal at the controller according to the packet identifier, wherein one or more haptic effects are rendered to a user according to the first drive signal and the second drive signal.

14. The non-transitory computer readable storage medium of claim 13, further comprising instructions for simultaneously transmitting the first and second drive signals.

15. The non-transitory computer readable storage medium of claim 13, further comprising instructions for synchronizing a first clock and a second clock, the first clock being disposed at a host device, and the second clock being disposed at a peripheral device.

16. The non-transitory computer readable storage medium of claim 13, wherein the composite drive signal packet data structure is received on a USB compliant channel.

17. The non-transitory computer readable storage medium of claim 13, wherein the first and second user input elements are disposed at a peripheral device comprising a controller or a gamepad.

18. The non-transitory computer readable storage medium of claim 13, wherein the first or second user input element is a trigger element of a peripheral device.

19. The method according to claim 1, wherein the composite drive signal packet data structure is determined by parsing haptic effect instructions of the one or more haptic effects into first haptic instructions for the first drive signal and second haptic instructions for the second drive signal; and mixing the first haptic instructions and the second haptic instructions into a single haptic instruction set.

* * * * *